UNITED STATES PATENT OFFICE.

HENRY A. AYLING, OF BOSTON, MASSACHUSETTS.

IMPROVED PRODUCT FROM CAOUTCHOUC, &c.

Specification forming part of Letters Patent No. 42,632, dated May 10, 1864.

*To all whom it may concern:*

Be it known that I, HENRY A. AYLING, of Boston, in the county of Suffolk and State of Massachusetts, have invented an Improved Product of which Caoutchouc is the Chief Component; and I do hereby declare that the following is a description of my invention sufficient to enable those skilled in the art to practice it.

My invention consists in an improved product or article of manufacture of which caoutchouc is the chief component, and which is combined with carbon spirits and chloride of sulphur. It is unnecessary here to describe articles so well known as are those first and last named. Carbon spirits is a fluid resultant from the distillation of petroleum or rock-oil, which fluid, when well refined, has a specific gravity of from about 0.600 to 0.750. It is known in commerce by this name, though various other appellations are given to it by manufacturers and dealers, being mostly trade-marks or fanciful names, and much of it is more or less mingled with impurities as it is found in the market, which causes its appearance to vary, though the best results are obtained with the best refined spirits.

The object of my invention is to produce a preparation of caoutchouc for use in the arts so changed from its natural state as to be unaffected by changes of temperature, by acids, oils, or fatty matters, or by exposure to the atmosphere, and so that its strength, elasticity, and durability are increased. The product is similar in these respects to that well known as "vulcanized rubber," which is produced by the combined action of heat and sulphur on caoutchouc, with these important exceptions, however, that, unlike vulcanized rubber, my product contains no chemically uncombined sulphur, and therefore there is not therein (as there is in vulcanized rubber) a continuous presence and action of free sulphur, which causes change and even decomposition in the course of time.

My improved product is superior to all vulcanized or cured preparations of caoutchouc, in that it is more permanent in its elasticity, more uniform in its texture and characteristics throughout, and in its freedom from odor. In connection with this freedom from odor, it should be mentioned that the smell of the carbon spirits and chloride of sulphur can be permanently removed from my improved product by washing it in a weak alkaline solution and by exposure to the air. The uniformity of product is consequent upon the easily-acquired and complete control which is obtained by the use of the chemicals employed.

In vulcanizing rubber there is always a risk of overheating or burning, which is avoided by my process, which is essentially a cold one, and may be described as bringing caoutchouc into contact for sufficient time with a compound consisting of a mixture substantially in the proportion of one measure of chloride of sulphur to fifty measures of carbon spirits, and then allowing the caoutchouc to dry by exposure to the atmosphere. This proportion of parts in the mixture may be somewhat varied, according to thickness of the rubber and the extent of the change desired therein, and yet be productive of similar results. Rubber of about a thickness corresponding with No. 20 wire-gage I submit to the action of the mixture for about one minute before exposing it to dry. If the caoutchouc is thicker, more time may be occupied, in which case I prefer to lessen the proportion of the chloride of sulphur; but I find that in practice a slight increase of the time of contact or repetitions of the contact after intervals causes no sensible further change in the caoutchouc. The fluid compound engages with one of the constituents of natural caoutchouc, and when this constituent has taken up or combined with the amount needed to effect the change no more enters into combination either chemically or mechanically; or if it does so enter it is at once discharged by volatilization or decomposition during the short time required for the caoutchouc to dry.

I claim—

The improved product resulting from the contact of caoutchouc with a mixture of carbon spirits and chloride of sulphur, substantially as specified.

In witness whereof I have hereunto set my hand this 3d day of April, A. D. 1863.

HENRY A. AYLING.

In presence of—
   J. B. CROSBY,
   EDW. H. SEARS.